United States Patent
Butwell et al.

(10) Patent No.: US 6,497,750 B2
(45) Date of Patent: Dec. 24, 2002

(54) PRESSURE SWING ADSORPTION PROCESS

(75) Inventors: Kenneth F. Butwell, Newburgh, NY (US); William B. Dolan, Yardley, PA (US); Steven M. Kuznicki, Whitehouse Station, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/793,039

(22) Filed: Feb. 26, 2001

(65) Prior Publication Data

US 2002/0162452 A1 Nov. 7, 2002

(51) Int. Cl.[7] .............................................. B01D 53/047
(52) U.S. Cl. ................. 95/96; 95/106; 95/130; 95/143; 95/901; 95/902
(58) Field of Search .................... 95/96–106, 114, 95/115, 130, 143, 901, 902

(56) References Cited

U.S. PATENT DOCUMENTS

| | | | |
|---|---|---|---|
| 2,656,010 A | 10/1953 | Thodos | |
| 2,843,219 A | 7/1958 | Habgood | |
| 2,918,140 A | 12/1959 | Brooks | |
| 3,430,418 A | 3/1969 | Wagner | |
| 3,738,087 A | 6/1973 | McCombs | |
| 4,190,424 A | 2/1980 | Armond et al. | |
| 4,512,780 A | 4/1985 | Fuderer | |
| 4,588,427 A | 5/1986 | Yao et al. | |
| 4,589,888 A | 5/1986 | Hiscock et al. | |
| 4,938,939 A | 7/1990 | Kuznicki | 423/326 |
| 4,964,888 A | 10/1990 | Miller | |
| 4,964,889 A | 10/1990 | Chao | |
| 5,174,796 A | 12/1992 | Davis et al. | |
| 5,248,322 A | 9/1993 | Kumar | 95/101 |
| 5,536,300 A | 7/1996 | Reinhold, III et al. | 95/101 |
| 5,669,958 A | 9/1997 | Baker et al. | 95/50 |
| 5,803,953 A | 9/1998 | Rojey et al. | 95/105 |
| 5,989,316 A | 11/1999 | Kuznicki et al. | 95/130 |
| 6,068,682 A | 5/2000 | Kuznicki et al. | 95/130 |
| 6,197,092 B1 | 3/2001 | Butwell et al. | 95/96 |
| 6,315,817 B1 * | 11/2001 | Butwell et al. | 95/130 X |

FOREIGN PATENT DOCUMENTS

| | | | |
|---|---|---|---|
| EP | 0297542 | 1/1989 | 95/130 |
| EP | 0302658 | 2/1989 | |
| WO | WO99/32222 | 1/1999 | |
| WO | WO99/32404 | 1/1999 | |

* cited by examiner

*Primary Examiner*—Robert H. Spitzer
(74) *Attorney, Agent, or Firm*—Stuart D. Frenkel

(57) ABSTRACT

A pressure swing adsorption process for the separation of nitrogen from a mixture of same with methane, utilizing two separate PSA stages, one containing a nitrogen selective adsorbent and the second containing a methane-selective adsorbent. In the process, the first PSA unit containing a nitrogen selective adsorbent forms a product methane stream and a waste stream rich in nitrogen which is passed to a second PSA unit containing a methane selective adsorbent which forms a product nitrogen stream and a waste stream rich in methane. The waste stream rich in methane can be treated to remove heavy hydrocarbons therefrom before the methane is recycled to feed.

20 Claims, 6 Drawing Sheets

PRESSURE SWING ADSORPTION PROCESS

FIELD OF THE INVENTION

This invention relates to the purification of natural gas, and, more particularly, to the removal of nitrogen from natural gas by use of a molecular sieve in a novel pressure swing adsorption (PSA) process.

BACKGROUND OF THE INVENTION

The removal of nitrogen from natural gas is of considerable importance inasmuch as nitrogen is present to a significant extent. Nitrogen contamination lowers the heating value of the natural gas and increases the transportation cost based on unit heating value.

Applications aimed at removing nitrogen and other impurities from natural gas streams provide significant benefits to the U.S. economy. In 1993, the Gas Research Insitute (GRI) estimated that 10–15% (~22 trillion cubic feet) of the natural gas reserves in the U.S. are defined as sub-quality due to contamination with nitrogen, carbon dioxide, sulfur. Most of these reserves, however, have discounted market potential, if they are marketable at all, due to the inability to cost effectively remove the nitrogen. Nitrogen and carbon dioxide are inert gases with no BTU value and must be removed to low levels (4% typically) before the gas can be sold.

Concurrently, the U.S. has proven reserves of natural gas totaling 167 trillion cubic feet. Over the past five years, annual consumption has exceeded the amount of new reserves that were found. This trend could result in higher cost natural gas and possible supply shortages in the future. As the U.S. reserves are produced and depleted, finding new, clean gas reserves involves more costly exploration efforts. This usually involves off shore exploration and/or deeper drilling onshore, both of which are expensive. Moreover, unlike crude oil, it is not economical to bring imports of natural gas into North America, therefore pricing of natural gas could be expected to rise forcing end users to seek alternative fuels, such as oil and coal, that are not as clean burning as gas. While base consumption for natural gas in the U.S. is projected to grow at 2–3% annually for the next ten years, one segment may grow much more rapidly. Natural gas usage in electric power generation is expected to grow rapidly because natural gas is efficient and cleaner burning allowing utilities to reduce emissions. Accordingly, there is a need to develop a cost-effective method of upgrading currently unmarketable sub-quality reserves in the U.S. thereby increasing the proven reserve inventory.

Methods heretofore known for purification of natural gas, in particular, nitrogen removal, may be divided roughly into three classifications:

(a) Methods involving fractional distillation at low temperature and (usually) high pressure, i.e. cryogenics. Since nitrogen has a lower boiling point than methane and the other hydrocarbons present in natural gas, it may be removed as a gas on liquefying the remaining constituents which are then revaporized.

(b) By selective adsorption of the methane and higher hydrocarbons on an adsorbent such as activated charcoal. The adsorbed gases are then desorbed to give a gas free of nitrogen.

(c) Miscellaneous processes involving selective diffusion through a series of organic membranes, formation of lithium nitride by treatment with lithium amalgam, absorption of the nitrogen in liquid ammonia or in liquid sulphur dioxide.

The principal disadvantage of the fractional distillation and adsorption processes is that they remove the major component, methane, from the minor component, nitrogen, instead of the reverse. In cryogenic processing, almost the entire volume of natural gas must be refrigerated, usually compressed, and then heated again. Accordingly, cryogenic processing is expensive to install and operate, limiting its application to a small segment of reserves. Cryogenic technology is believed only capable of cost effectively purifying reserves, which exceed 50,000,000 standard cubic feet of gas per day and as well having nitrogen contamination levels of 15% or more. Gas reserves that do not fit these criteria are not currently being purified. The potential value of this gas is totally lost as the wells are usually capped. The processes suggested under paragraph (c) above are handicapped by an unsatisfactory degree of separation or by the use of very expensive materials.

In smaller-scale natural gas operations as well as in other areas such as synthesis gas and coke oven gas processing, adsorption processes can be especially well suited. The adsorption capacities of adsorption units can, in many cases, be readily adapted to process gas mixtures of varying nitrogen content without equipment modifications, i.e. by adjusting adsorption cycle times. Moreover, adsorption units can be conveniently skid-mounted, thus providing easy mobility between gas processing locations. Further, adsorption processes are often desirable because more than one component can be removed from the gas. As noted above, nitrogen-containing gases often contain other gases that contain molecules having smaller molecular dimensions than nitrogen, e.g., for natural gas, carbon dioxide, oxygen and water, and for coke oven gas, carbon monoxide.

U.S. Pat. No. 2,843,219 discloses a process for removing nitrogen from natural gas utilizing zeolites broadly and contains specific examples for the use of zeolite 4A. The process disclosed in the patent suggests use of a first nitrogen selective adsorbent zeolite in combination with a second methane selective adsorbent. The molecular sieve adsorbent for removing nitrogen is primarily regenerated during desorption by thermal swing. A moving bed adsorption/desorption process is necessary for providing sufficient heat for the thermal swing desorption. The moving bed process specifically disclosed in this patent is not practical and it does not provide a cost efficient method for the separation of nitrogen from natural gas in view of high equipment and maintenance costs and degradation of the adsorbent by attrition due to contact with the moving adsorbent particles.

Despite the advantageous aspects of adsorption processes, the adsorptive separation of nitrogen from methane has been found to be particularly difficult. The primary problem is in finding an adsorbent that has sufficient selectivity for nitrogen over methane in order to provide a commercially viable process. In general, selectivity is related to polarizability, and methane is more polarizable than nitrogen. Therefore, the equilibrium adsorption selectivity of essentially all known adsorbents such as large pore zeolites, carbon, silica gel, alumina, etc. all favor methane over nitrogen. However, since nitrogen is a smaller molecule than methane, it is possible to have a small pore zeolite which adsorbs nitrogen faster than methane. Clinoptilolite is one of the zeolites which has been disclosed in literature as a rate selective adsorbent for the separation of nitrogen and methane.

U.S. Pat. No. 4,964,889 discloses the use of natural zeolites such as clinoptilolites having a magnesium cation content of at least 5 equivalent percent of the ion-exchangeable cations in the clinoptilolite molecular sieve for the removal of nitrogen from natural gas. The patent discloses that the separation can be performed by any known adsorption cycle such as pressure swing, thermal swing, displacement purge or nonadsorbable purge, although pressure swing adsorption is preferred. However, this patent is silent as to specifics of the process, such as steps for treating the waste gas, nor is there disclosure of a high overall system recovery.

In general, first applications of PSA processes were performed to achieve the objective of removing smaller quantities of adsorbable components from essentially non-adsorbable gases. Examples of such processes are the removal of water from air, also called heatless drying, or the removal of smaller quantities of impurities from hydrogen. Later this technology was extended to bulk separations such as the recovery of pure hydrogen from a stream containing 30 to 90 mole percent of hydrogen and other readily adsorbable components like carbon monoxide or dioxide, or, for example, the recovery of oxygen from air by selectively adsorbing nitrogen onto molecular sieves.

The carrying out of the PSA processes in multi-bed systems is illustrated by the Wagner patent, U.S. Pat. No. 3,430,418, relating to a system having at least four beds. As is generally known and described in this patent, the PSA process is commonly performed in a cycle of a processing sequence that includes in each bed: (1) higher pressure adsorption with release of product effluent from the product end of the bed; (2) co-current depressurization to intermediate pressure with release of void space gas from the product end thereof; (3) countercurrent depressurization to a lower pressure; (4) purge; and (5) pressurization. The void space gas released during the co-current depressurization step is commonly employed for pressure equilization purposes and to provide purge gas to a bed at its lower desorption pressure.

Similar systems are known which utilize three beds for separations. See, for example, U.S. Pat. No. 3,738,087 to McCombs. The faster the beds perform steps 1 to 5 to complete a cycle, the smaller the beds can be when used to handle a given hourly feed gas flow. If two steps are performed simultaneously, the number of beds can be reduced or the speed of cycling increased; thus, reduced costs are obtainable.

U.S. Pat. No. 4,589,888 to Hiscock, et. al. discloses that reduced cycle times are achieved by an advantageous combination of specific simultaneous processing steps. The gas released upon co-current depressurization from higher adsorption pressure is employed simultaneously for pressure equalization and purge purposes. Co-current depressurization is also performed at an intermediate pressure level, while countercurrent depressurization is simultaneously performed at the opposite end of the bed being depressurized.

U.S. Pat. No. 4,512,780 to Fuderer discloses a pressure swing adsorption process with intermediate product recovery. Three products are recovered from a pressure swing adsorption process utilizing a displacement step in conjunction with pressure equalization between beds of a multi-bed adsorption system. This process is not cost efficient for the recovery of two products.

PSA processes were first used for gas separations in which only one of the key components was recovered at high purity. For example, from 100 mols feed gas containing 80 mols hydrogen and 20 mols carbon monoxide, the process of Wagner, U.S. Pat. No. 3,430,418, or of Hiscock, et. al., U.S. Pat. No. 4,589,888, could separate 60 mols of hydrogen at 99.999% purity, but no pure carbon monoxide could be recovered; 20 mols of carbon monoxide and 20 mols of hydrogen remained mixed at 50% purity each. Neither of these processes can make a complete separation. Only the less adsorbable, light component is recovered at high purity.

For the recovery of a pure, stronger adsorbed, "heavy" component, an additional step is necessary, namely, rinsing of the bed with a heavy component to displace the light component from the bed prior to depressurization. The rinsing step is described in several earlier patents. The problems with these processes are the following: (a) if the rinsing is complete and the light component is completely displaced from the bed, pure heavy component can be obtained, but the adsorption front of the heavy component breaks through to the light component and the latter cannot be recovered at high purity; (b) if the displacement of the light component is incomplete, the typical concentration profile of the heavy component in the bed is not optimum and such bed is depressurized countercurrently to recover the heavy key component at the feed end, the light component still present in the bed reaches the feed end very rapidly and the purity of the heavy component drops. Therefore, it is not practical with the prior art processes to obtain both key components at high purity in a single PSA unit.

Such complete separations can be obtained, for example, by two separate pressure swing adsorption processing units wherein each unit includes several fixed beds. From a feed gas containing, for example, hydrogen and carbon monoxide (CO), the first unit recovers pure hydrogen and a carbon monoxide rich gas containing 70% carbon monoxide. This gas mixture is compressed and passed through a second PSA unit which recovers pure carbon monoxide and a hydrogen rich gas. The hydrogen rich gas can be added as feed gas to the first PSA unit and then the cycle is repeated. The combination of two independent PSA units can make an excellent separation at very high flexibility. For example, from a gas mixture with two components this system can recover more than 99.8% of the adsorbable "light" component such as hydrogen at a purity of 99.999% and also recover essentially 100% of the more readily adsorbed component such as carbon monoxide at a purity higher than 99.5%.

Although pressure swing separation adsorption (PSA) has been used to separate a wide variety of gases, the simple fact remains that there is no commercially practiced PSA process for the separation of nitrogen from methane. This is due to many factors including the lack of a nitrogen specific adsorbent and environmental regulations.

As previously pointed out, a significant percentage of U.S. natural gas reserves contain more than 4% nitrogen. The bulk of these reserves cannot be exploited because no economical technology exists for removing nitrogen especially at low flow rates, i.e., less than 25 MMSCFD process feed gas. Cryogenic distillation is the only process being used to date on any scale to remove nitrogen from methane in natural gas. Cryogenic plants are not used more widely because they are expensive and complicated and exhibit poor scale down economics.

It is the primary objective of this invention to provide a commercially viable PSA process for removing nitrogen from natural gas.

A further object of the invention is to provide a PSA process for removing nitrogen from natural gas which can provide a highly concentrated methane product at high process efficiencies.

Another object of this invention is to separate nitrogen from natural gas by a novel PSA process which yields a methane product, and a high purity nitrogen stream.

Still another object of the invention is to provide and maintain peak efficiency of the nitrogen-selective adsorbent during PSA separation of nitrogen from natural gas.

SUMMARY OF THE INVENTION

This invention provides a PSA system to achieve separation of nitrogen from natural gas with high system recovery of separate methane and nitrogen product streams from the feed gas. This is accomplished by placing a methane selective adsorbent in a PSA system on the waste stream of a nitrogen-selective PSA system in order to boost the methane recovery of the system and further generate a high purity nitrogen gas stream that could be utilized for other related unit operations or vented to the atmosphere.

In another aspect of the invention, the methane-enriched waste stream from the methane selective PSA is cooled to remove $C_3+$ hydrocarbons before being recycled to feed so as to eliminate the build up of heavy hydrocarbons in the PSA units.

DETAILED DESCRIPTION OF THE INVENTION

As is known in the prior art, natural gas streams frequently contain components smaller than nitrogen, such as water vapor, carbon dioxide and hydrogen sulfide. The gas stream to be treated in accordance with the novel process of this invention preferably would have these contaminants removed prior to treatment of the feed gas stream in accordance with the novel process of this invention.

The amount of nitrogen present in said feed gas stream is not critical in carrying out the novel process of this invention and can be as low as 1 mol percent or as high as about 65 mol percent. Typically, the nitrogen content is in the range of 5 to 30 mol percent.

Figure 1:
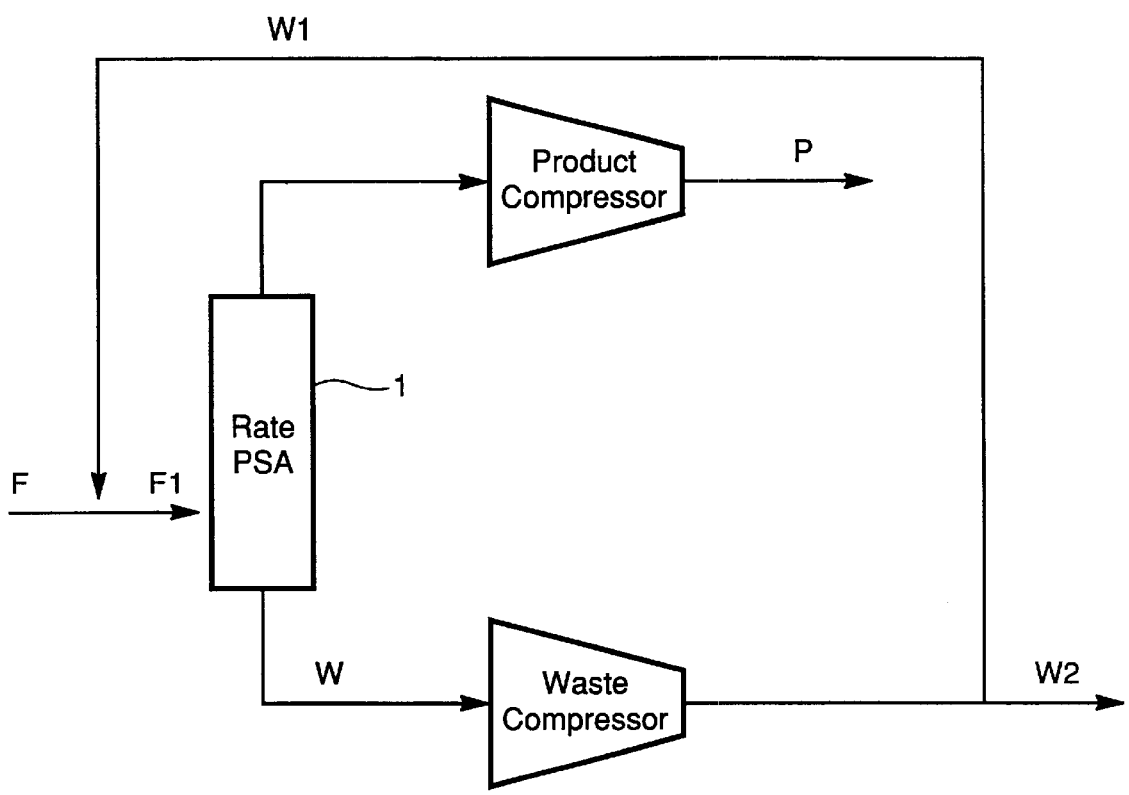
FIG. 1 represents a PSA process with recycle of the waste gas where only a nitrogen selective crystalline zeolite is used.

As has been heretofore stated, FIG. 1 is a schematic illustration of using only a nitrogen selective crystalline zeolite adsorbent. As can be seen from FIG. 1, a mixture F1 of a feed gas F and recycle W1 is introduced into an adsorption column 1 containing a nitrogen selective zeolite molecular sieve. From the top of the column 1 a methane product P is recovered and from the bottom of the column a waste W is recovered and may be compressed and split into two fractions, a recycle fraction labeled as W1 and a waste fraction identified as W2.

Figure 2:
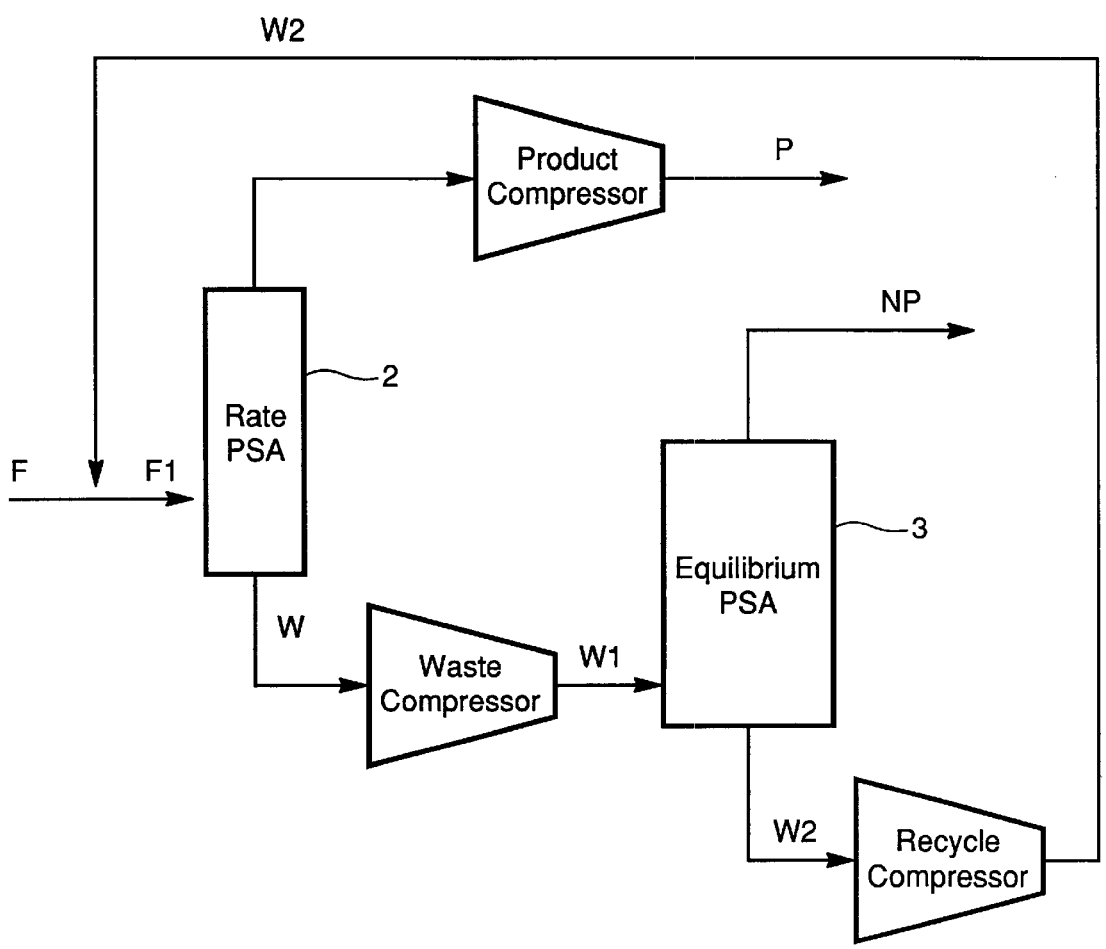
FIG. 2 represents a PSA process utilizing both a nitrogen selective crystalline zeolite and a methane selective adsorbent wherein the methane is recycled back to the feed gas.

FIG. 2 represents an illustration of a novel process of this invention where a first PSA system depicted as column 2, is used involving a nitrogen selective molecular sieve and wherein the waste W1 is treated in a second PSA process, depicted in column 3, involving the use of a methane selective adsorbent. The identification in FIG. 2 is the same as in FIG. 1 with the sole exception that the waste from the PSA column 2 is treated with a methane selective adsorbent and product fractions identified as NP (nitrogen product) and P (methane product) are recovered, and a recycle fraction identified as W2 is recovered and recycled to the PSA column 2.

Figure 3:
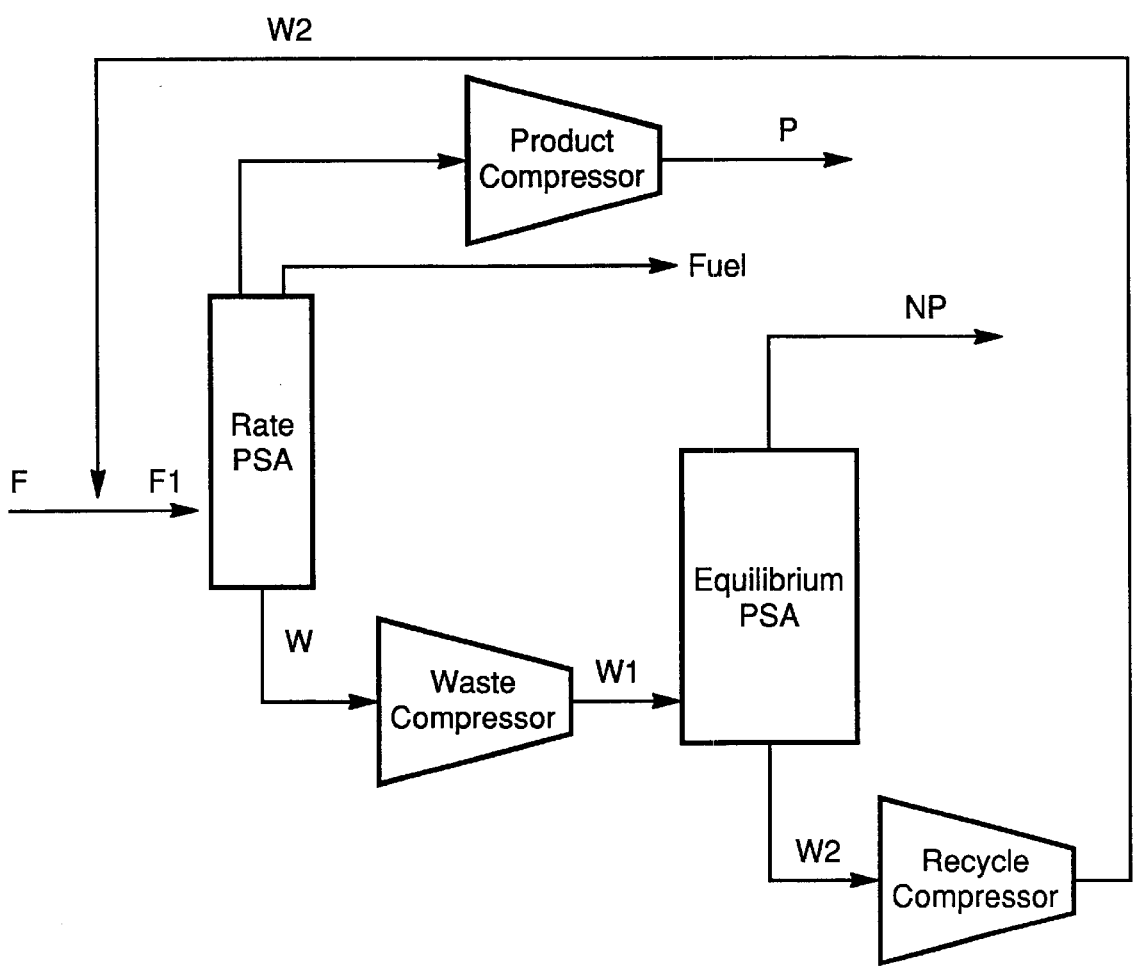
FIG. 3 is substantially similar to FIG. 2 except a fuel generation step is introduced into the PSA cycle.

FIG. 3 represents a modification of FIG. 2 in that a fuel fraction is obtained from the top of the PSA column 2 and used as fuel.

Figure 4:
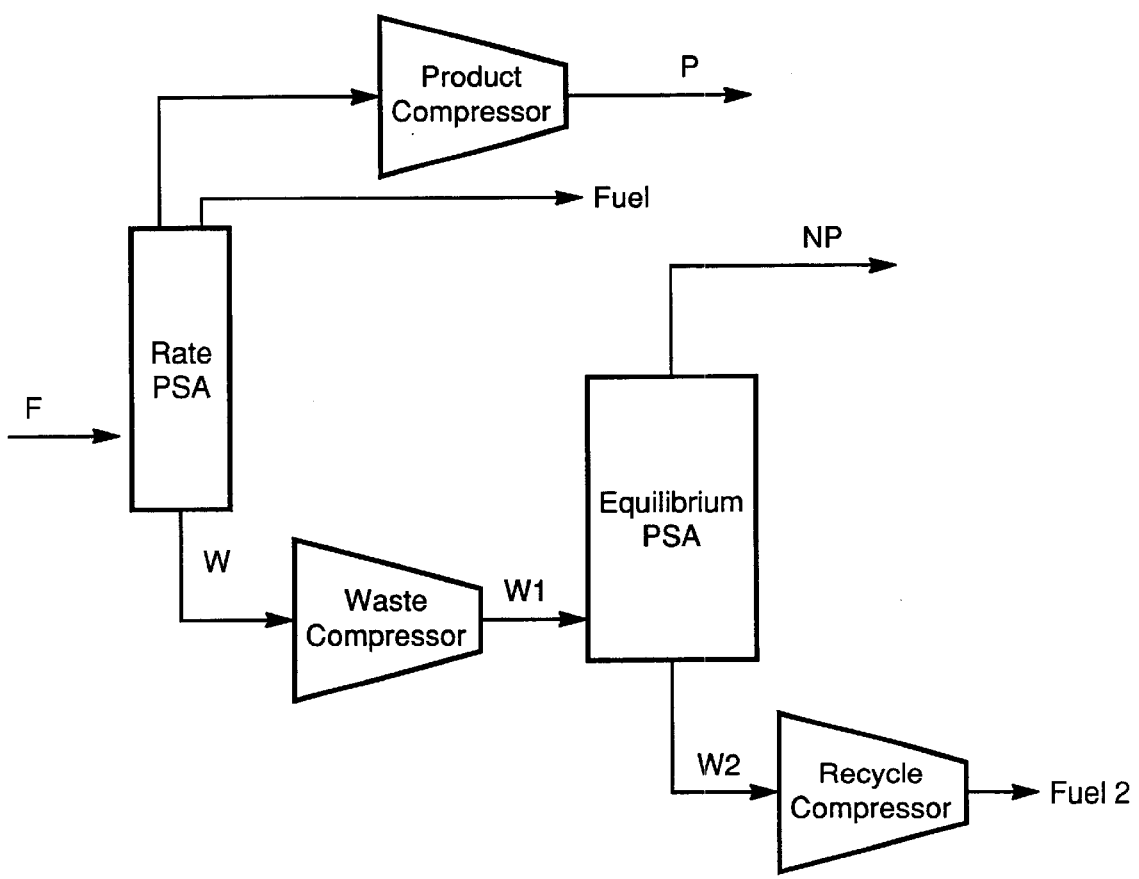
FIG. 4 is substantially similar to FIG. 3 except the stream designated by W2 is routed to Fuel 2.

FIG. 4 represents a modification of FIG. 3 in that the stream designated as W2 is routed to Fuel 2, i.e., two fuel streams are produced.

The following Table 1 compares the Material Balances of the various processes set forth in FIGS. 1, 2, 3, and 4.

In the table, the nitrogen selective PSA unit was run under rate adsorption conditions and the methane selective PSA was run under equilibrium adsorption conditions as shown in the Figures. The preferred nitrogen selective adsorbent used is believed to be size selective for nitrogen and thus can be used under equilibrium conditions with similar recoveries as shown in Table 1.

TABLE 1

Material Balances Tables

| FIG. 1 Rate PSA System With Recycle | F | F1 | P | W | W1 | W2 | |
|---|---|---|---|---|---|---|---|
| Flow (MMSCFD) | 15 | 33.75 | 11.25 | 22.5 | 18.75 | 3.75 | |
| mol % C1 | 75.00% | 40% | 96.00% | 12.00% | 12.00% | 12.00% | |
| Single Pass Recovery | 80% | | | | | | |
| Overall Plant Recovery | 96.00% | | | | | | |
| FIG. 2 Rate and Equ PSA | F | F1 | P | W1 | W2 | NP | |
| Flow (MMSCFD) | 15 | 18.46 | 11.58 | 6.89 | 3.46 | 3.42 | |
| mol % C1 | 75.00% | 75.24% | 96.00% | 40.34% | 76.27% | 4.00% | |
| Single Pass Recovery | 80% | | | | | | |
| Overall Plant Recovery | 98.78% | | | | | | |
| FIG. 3 Rate and Eq PSA with fuel | F | F1 | P | W1 | W2 | NP | Fuel |
| Flow (MMSCFD) | 15 | 16.92 | 11.58 | 5.34 | 1.92 | 3.42 | 1.16 |
| mol % C1 | 75.00% | 72.98% | 96.00% | 23.11% | 57.19% | 4.00% | 96.00% |
| Single Pass Recovery | 80% | | | | | | |
| Fuel | 10% | | | | | | |

TABLE 1-continued

Material Balances Tables

| | | | | | | |
|---|---|---|---|---|---|---|
| Overall Plant Recovery including fuel | 98.78% | | | | | |
| FIG. 4 Rate and Eq PSA no recycle two fuel streams | F | P | W | Fuel 1 | NP | Fuel 2 |
| Flow (MMSCFD) | 15 | 9.38 | 5.04 | 0.59 | 2.79 | 2.25 |
| mol % C1 | 75.00% | 96.00% | 33.49% | 96.00% | 4.00 | 70.16% |
| Single Pass Recovery | 80% | | | | | |
| Fuel | 19% | | | | | |

As can be seen from the above Table 1, in FIG. 1 a feed F containing a mixture of 75 mol percent methane and 25 mol percent nitrogen is introduced into a rate PSA column together with a recycle stream identified as W1, to form a feed mixture F1 which contains 40% of methane. It can be seen from the Material Balance Table in connection with FIG. 1 that the single pass recovery is 80%. Single pass recovery is defined as methane mol fraction in the gas phase, multiplied by the mols of product per hour divided by the feed methane mol fraction gas phase times the mols of product per hour. Thus, in connection with FIG. 1 the product contains 96% of methane times a flow rate of 11.25 MMSCFD divided by 40% methane times 33.75 MMSCFD in order to obtain a single pass recovery of 80%. Overall plant recovery is obtained from P flow rate times P methane composition divided by F times F's methane composition and is 96%.

Although the amount of methane recovery in terms of percentage is high, nevertheless the process set forth in FIG. 1 generally requires the processing of an extremely large recycle stream identified as W1. In fact the recycle stream which is being processed is greater than the feed stream. Quite obviously, the economics of this process need improvement.

Reference to the above material balance in Table 1 in connection with FIG. 2, which represents the novel process of this invention, will show that the single pass recovery is the same; however, the overall plant recovery increases from 96% to 98.78%. Far more importantly, the recycle stream W2 is significantly reduced compared to the recycle stream in FIG. 1, i.e., 3.46 as opposed to 18.75 MMSCFD. The productivity of the unit is inherently increased because less of a recycle stream needs to be mixed with the feed stream.

FIG. 3 represents an embodiment in the novel process of this invention wherein upon need of a fuel requirement in the system, a vent step can be placed in the rate PSA cycle. As can be seen from the Material Balance Table, this further reduces the recycle flow of W2 down to 1.92 MMSCFD.

The temperature of the rate PSA (first stage) is preferably maintained in the range of from about −50° to +100° C., and more preferably from 0° to 70° C. The pressure during the adsorption is from about 20 psia to 2,000 psia, and preferably about 100 to 1,500 psia and more preferably from 500 to 1,000 psia. The pressure during desorption being lower than during adsorption and effective to cause the desorption of nitrogen, is preferably from about 1 to 150 psia, more preferably from about 5 to 50 psia and most preferably from about 5 to 25 psia. The cyclic process can comprise additional adsorption and regeneration steps as well as intermediate depressurization and purging steps, as is well-known in the art.

As can be seen from Table 1, the product from this first stage PSA contains 96 mol percent of methane and only 4 mol percent of nitrogen. Quite obviously, the product is a quality fuel. However, the purge or waste from this first stage PSA contains 12 mol percent of methane and 88 mol percent of nitrogen. Quite obviously, it cannot be used as a fuel due to its high nitrogen content nor can it be discharged to the atmosphere. Such discharge is not in the best interest of the environment and it also involves a waste of methane.

Thus, in accordance with this invention, as shown in FIG. 2 and FIG. 3, the waste or purge stream from the first stage of a PSA is fed to a second stage PSA containing an adsorbent which is selective for methane. Benefits of such processing are shown in Table 1.

The second stage PSA operates at a temperature of −30° to 140° F., preferably 70° to 120° F. and at a pressure of from 1 to 2,000 psia, preferably 5 to 60 psia utilizing an adsorbent selective for methane as will be later defined.

The waste or purge stream can be recycled back to the feed stream as shown in FIGS. 2 and 3 or used as fuel as shown in FIG. 4.

Figure 6:
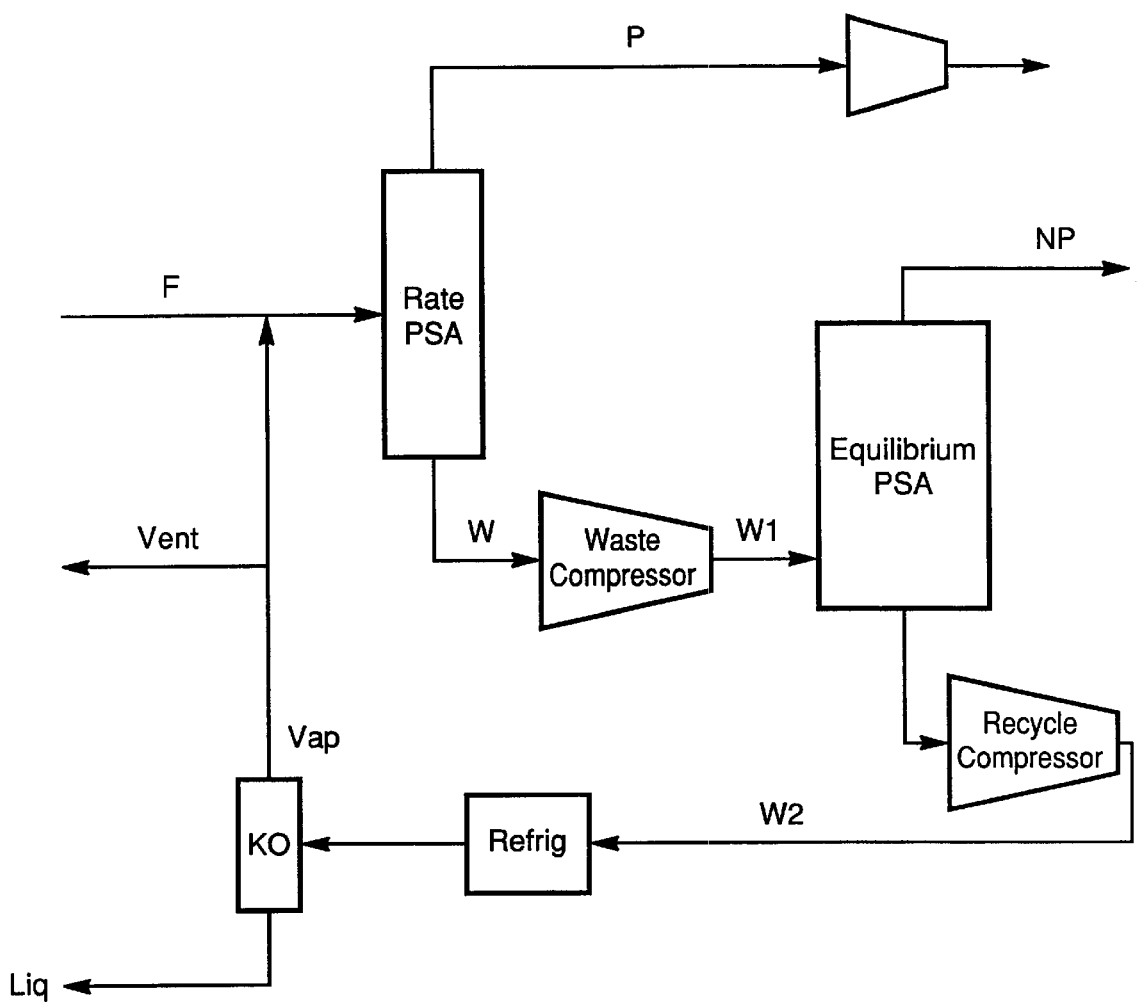
FIG. 6 is similar to the process scheme of FIG. 2, except the methane recycle is first treated to remove heavy hydrocarbons.

FIG. 6 represents an improvement over the process set forth in FIGS. 2 and 3 wherein the methane-enriched waste stream from the second PSA unit is recycled to feed. What has been found is that by the continuous recycle of the methane-enriched waste stream W2 to the feed stream, both the first and second PSA units accumulate the heavier hydrocarbon components including $C_3+$ materials. These materials can continually build up in the recycle stream. The process scheme shown in FIG. 6 alleviates this problem by removing the heavier hydrocarbons from the methane enriched stream W2 prior to recycle to feed. Thus, as shown in FIG. 6 the stream W2 subsequent to recycle compression is refrigerated to a temperature of from about −30° to about 30° C. and the cooled methane enriched stream W2 is then forwarded to a knock out separator KO to separate the heavy hydrocarbons in liquid form from the lighter components including methane which can be recycled as a gas to the feed F. Typically, the $C_3+$ hydrocarbons will comprise from about 1 to about 25 mol % of stream W2. The reduction of these heavy hydrocarbons from the recycle stream W2 reduces the level that these hydrocarbons accumulate in the PSA processes.

The Nitrogen Selective Crystalline Zeolite

The nitrogen selective crystalline zeolites utilized in the first stage PSA are either CTS-1 zeolites described and claimed in the U.S. Pat. No. 6,068,682, issued May 30, 2000 and assigned to Engelhard Corporation, or barium exchanged ETS-4 described and claimed in the U.S. Pat. No.

5,989,316, issued Nov. 23, 1999 and again assigned to present assignee Engelhard Corporation.

The CTS-1 zeolites are characterized as having a pore size of approximately 3–4 Angstrom units and a composition in terms of mol ratios of oxide as follows:

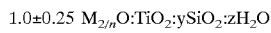

$1.0 \pm 0.25\ M_{2/n}O:TiO_2:ySiO_2:zH_2O$ wherein M is at least one cation having a valence n, y is from 1.0 to 100 and z is from 0 to 100, said zeolite being characterized by the following X-ray diffraction pattern.

| D-spacings (Angstroms) | I/I$_0$ |
|---|---|
| 11.3 ± 0.25 | Very Strong |
| 6.6 ± 0.2 | Medium-Strong |
| 4.3 ± 0.15 | Medium-Strong |
| 3.3 ± 0.07 | Medium-Strong |
| 2.85 ± 0.07 | Medium-Strong | wherein very strong equals 100, medium-strong equals 15–80.

The CTS-1 materials are titanium silicates which are different than conventional aluminosilicate zeolites. The titanium silicates useful herein are crystalline materials formed of octahedrally coordinated titania chains which are linked by tetrahedral silica webs. The CTS-1 adsorbents are formed by heat treating ETS-4 which is described in U.S. Pat. No. 4,938,939, issued Jul. 3, 1990 and assigned to Engelhard Corporation. U.S. Pat. Nos. 4,938,939; 5,989, 316; and 6,068,682 are herein incorporated by reference.

Barium ETS-4 is ETS-4 which has been exchanged with barium such that barium represents at least 30% of the exchangeable cations of ETS-4.

The Methane Selective Crystalline Zeolite

The methane selective adsorbent used in the second stage PSA is either a crystalline aluminosilicate zeolite such as 13X or a high aluminum X having a silicon-to-aluminum ratio of about 1 or an amorphous adsorbent such as silica gel or carbon.

It is preferred to employ the high aluminum X zeolite in the sodium form although other exchanged forms can be used.

A particularly preferred high aluminum X is zeolite XE whose preparations will be shown in the examples.

The most preferred methane adsorbent is carbon.

As is known in the PSA art, the zeolites are composited or grown in-situ with materials such as clays, silica and/or metal oxides. The latter may be either naturally occurring or in the form of gelatinous precipitates or gels including mixtures of silica and metal oxides. Normally crystalline materials have been incorporated into naturally occurring clays, e.g., bentonite and kaolin, to improve the crush strength of the sorbent under commercial operating conditions. These materials, i.e., clays, oxides, etc., function as binders for the sorbent. It is desirable to provide a sorbent having good physical properties because in a commercial separation process, the zeolite is often subjected to rough handling which tends to break the sorbent down into powder-like materials which cause many problems in processing. These clay binders have been employed for the purpose of improving the strength of the sorbent.

Naturally occurring clays that can be composited with the crystalline zeolites include the smectite and kaolin families, which families include the montmorillonites such as subbentonites and the kaolins known commonly as Dixie, McNamee, Georgia and Florida or others in which the main constitutent is halloysite, kaolinite, dickite, nacrite or anauxite. Such clays can be used in the raw state as originally mined or initially subjected to calcinations, acid treatment or chemical modification.

In addition to the foregoing materials, the crystalline zeolites may be composited with matrix materials such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel. The relative proportions of finally divided crystalline metal organosilicate and inorganic oxide gel matrix can vary widely with the crystalline organosilicate content ranging from about 5 to about 90 percent by weight and more usually in the range of 90 percent by weight of the composite.

Prior to being used, the adsorbents are thermally treated as is well-known in the art.

If carbon or silica gel is used as the methane selective adsorbent, they need not be composited with the aforementioned materials.

The following examples will illustrate the novel processes of this invention.

EXAMPLE 1

In this Example, reference to FIG. 2 and Table 2 below is made. A feed gas of approximately 1 MMSCFD is introduced into a bed containing approximately 60 ft3 of adsorbent. The adsorbent consists of beads of CTS-1 or BA-ETS-4 zeolite with a mesh range of 4 to 40. The feed gas F1 is fed for a period of approximately 80 seconds at a pressure of approximately 400 psia. The stream leaving the top of the PSA column 2 at this point is designated P in Table 2 below. At the end of 80 seconds, the feed supply is closed off. The bed is then depressurized co-currently to another bed or a tank in a step referred in the art as equalization. The pressure at the end of the first equalization is approximately 240 psia. The bed is further depressurized co-currently to a pressure of 120 psia to a second bed or tank in an additional equalization. The two equalization steps are allowed approximately 20 seconds each to complete. After the bed has completed two equalizations it is further co-currently depressurized to 75 psia to provide purge gas to another bed. The purge gas can be stored temporarily in a tank or allowed to go directly into another bed. The providing purge gas step is given approximately 20 seconds to complete. The bed is then counter-currently depressurized to a pressure of approximately 5 psia for a period of approximately 10 seconds (blow down gas). Next the bed is purged counter currently with a gas from either a tank previously filled from the provide purge step, or another bed undergoing a co-current depressurization. The purge step takes approximately 100 seconds to complete. The gas leaving the bed during the purge step gas and previous blow down gas steps are combined to create the stream designated W. The composition and flow of the stream designated W can be found in Table 2. Then the bed is pressurized with gas from the previous equalization steps and brought back up to a pressure of approximately 240 psia pressure. Subsequently the bed is pressurized counter-currently with product gas, or alternatively pressurized with feed gas co-currently.

The rate process waste stream W is compressed to a pressure of approximately 50 psia to form stream W1. This stream is then fed to a second PSA holding 40 ft3 of adsorbent where it is fed for a period of approximately 160 seconds. The gas leaving the second PSA bed during this step is designated "NP" and has a flow and composition as designated in Table 2. Then equalization to a second bed is completed in the co-current direction at which point the pressure is approximately 28 psia. The bed is further co-currently depressurized to approximately 15 psia to provide a purge gas for subsequent use. Next the bed is depressurized counter-currently (blown down) to a pressure of 5 psia. The bed is then purged with gas provided from a second bed or tank at 5 psia. The gas leaving the bed during the blow down and purge steps are combined to give the "W2" stream. Finally, the bed is brought back up to pressure by counter-currently pressurizing to the adsorption pressure using equalization gas and product gas. The equalization and provide purge steps are given approximately 20 seconds each to complete. The purge step is given approximately 80 seconds to complete.

Material balances for the two units are given in Table 2 below. Those skilled in the art will recognize that the process can be defined by the boundary flows about the unit, the number of equalizations, and provide purge ending pressure. This information gives sufficient information for those skilled in the art to practice said invention. As can be seen in Table 2, the rate PSA recovers 80% of the methane in the feed gas in a single pass configuration. By further processing the rate PSA waste stream it is possible to recover 93.7% of the methane leaving the rate process at a composition close to the feed composition. This stream identified as "W2" can then be recycled back to the feed and of the process to bring the overall plant recovery to 98.74%, a significant improvement over the 80% single pass recovery.

TABLE 2

|  | F | P | W | NP | W2 |
|---|---|---|---|---|---|
| Flow (MMSCFD) | 1 | 0.625 | 0.375 | 0.189474 | 0.185526 |
| Pressure (psia) | 400 | 400 | 5 | 50 | 5 |
| Temperature (F.) | 80 | 90 | 60 | 85 | 60 |
| Comp (mol %) C1 | 75% | 96% | 40.00% | 5% | 75.74% |
| Comp (mol %) N2 | 25% | 4% | 60.00% | 95% | 24.26% |
| Rec C1 |  | 80% | 20.0% | 6.3% | 93.7% |
| Overall C1 Rec |  | 98.74% |  |  |  |

TABLE 3

|  | F | P | Fuel | W | NP | W2 |
|---|---|---|---|---|---|---|
| Flow (MMSCFD) | 1 | 0.625 | 0.46875 | 0.328125 | 0.179688 | 0.148438 |
| Pressure (psia) | 400 | 400 | 50 | 5 | 50 | 5 |
| Temperature (F.) | 80 | 90 | 80 | 60 | 85 | 60 |
| Comp (mol %) C1 | 75% | 96% | 80% | 34% | 5% | 69.74% |
| Comp (mol %) N2 | 25% | 4% | 20% | 66% | 96% | 30.26% |
| Rec C1 |  | 80% | 5% |  | 1.2% | 13.8% |
| Overall C1 Rec |  | 98.80% |  |  |  |  |

EXAMPLE 2

In this Example, reference is made to FIG. 3 and Table 3. A feed gas of approximately 1 MMSCFD is introduced into a bed containing approximately 60 ft3 of adsorbent. The adsorbent consists of beads of CTS-1 or BA-ETS-4 zeolite with a mesh range of 4 to 40. The feed gas is fed for a period of approximately 80 seconds at a pressure of approximately 400 psia. The stream leaving the top of the PSA column 2 at this point is designated P in Table 3. At the end of 80 seconds, the feed supply is closed off. The bed is then depressurized co-currently to another bed or a tank in a step referred in the art as equalization. The pressure at the end of the first equalization is approximately 240 psia. The bed is further depressurized co-currently to a pressure of 120 psia to a second bed or tank in an additional equalization. The two equalization steps are allowed approximately 20 seconds each to complete. After the bed has completed two equalizations it is further co-currently depressurized to 90 psia to generate a fuel quality stream. The fuel stream is valuable as an energy source for other processing equipment, including compression dehydration and $CO_2$ removal processes. The bed is further co-currently depressurized to 70 psia to provide a purge gas to another bed. The purge gas can be stored temporarily in a tank or allowed to go directly into another bed. The providing purge gas step is given approximately 20 seconds to complete. The bed is then counter-currently depressurized to a pressure of approximately 5 psia for a period of approximately 10 seconds (blow down gas). Next the bed is purged counter currently with a gas from either a tank previously filled from the provide purge step, or another bed undergoing a co-current depressurization. The purge step takes approximately 100 seconds to complete. The gas leaving the bed during the purge step gas and previous blow down gas steps are combined to create the stream designated W. The composition and flow of the stream designated W can be found in Table 3. Then the bed is pressurized with gas from the previous equalization steps and brought back up to a pressure of approximately 240 psia pressure. Subsequently, the bed is pressurized counter-currently with product gas, or alternatively pressurized with feed gas co-currently.

The rate process waste stream W is compressed to a pressure of approximately 50 psia to form stream W1. Stream W1 is then fed to a second PSA holding 40 ft3 of adsorbent where it is fed for a period of approximately 160 seconds. The gas leaving the bed during this step is designated "NP" and has a flow and composition as designated in Table 3. Then equalization to a second bed is completed in the co-current direction at which point the pressure is approximately 28 psia. The bed is further co-currently depressurized to approximately 15 psia to provide a purge gas for subsequent use. Next the bed is depressurized counter-currently (blown down) to a pressure of 5 psia. The bed is then purged with gas provided from a second bed or tank at 5 psia. The gas leaving the bed during the blow down and purge steps are combined to give the "W2" stream. Finally, the bed is brought back up to pressure by counter-currently pressurizing to the adsorption pressure using equalization gas and product gas. The equalization and provide purge steps are given approximately 20 seconds each to complete. The purge step is given approximately 80 seconds to complete. Product recoveries are set forth in Table 3.

EXAMPLE 3

Figure 5:
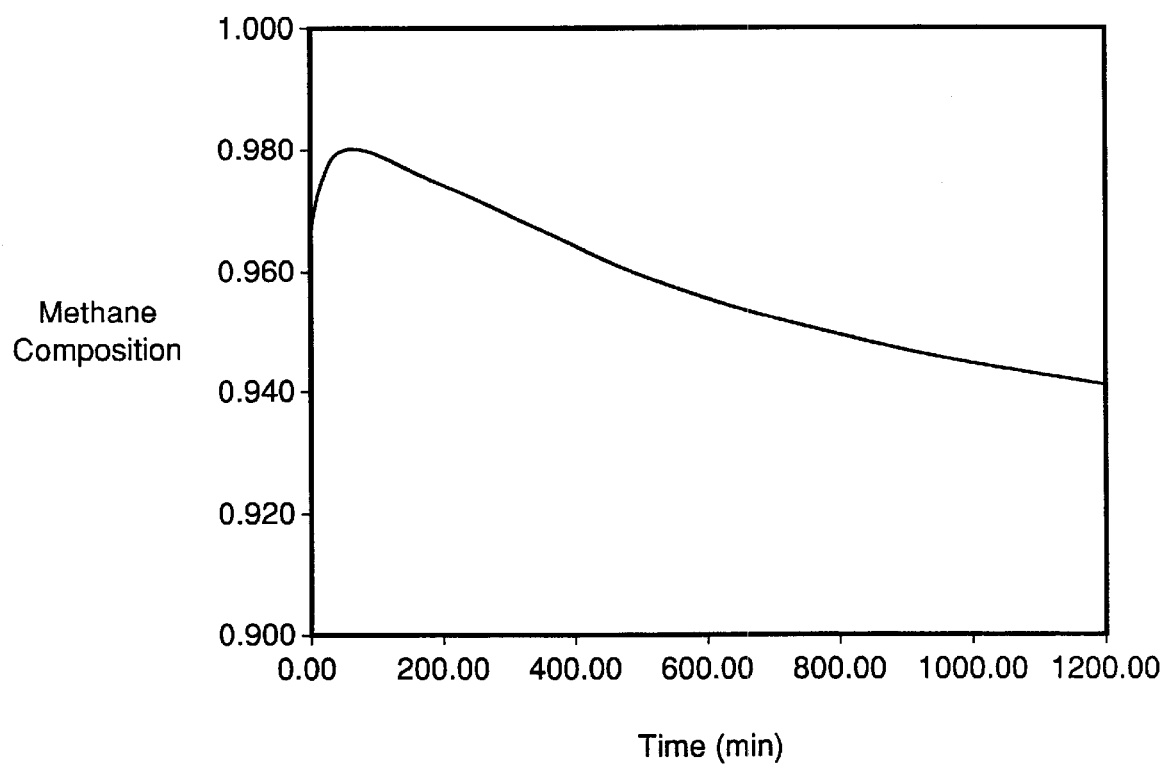
FIG. 5 is a graph of product purity v. time for a fixed product rate using a nitrogen-selective adsorbent.

The performance of the rate PSA as given in Example 1 represents average flows and compositions over a 24 hour time frame. After an initial 1 hour startup period the rate PSA starts producing a higher purity methane product stream P than the average purity as described in Table 2, subsequently after 8 hours the purity of the product stream drops below 96% purity. This phenomenon of a gradual degradation in performance is illustrated in FIG. 5. FIG. 5 shows the methane product purity v. time for a fixed feed flow rate. As can be seen in FIG. 5 the product purity v. time is dropping.

Periodically heating the bed increases the nitrogen working capacity (amount of nitrogen desorbed each cycle) of the rate PSA; it is believed that this is accomplished by lowering the methane loading on the adsorbent. The loss in nitrogen working capacity is illustrated by the lowering of product purity at a fixed feed rate. This performance decline v. time can be mitigated by periodically heating a bed(s) in the rate PSA with gas flow from stream NP of Table 2. For example, this stream can be used to heat the rate PSA to 200° F. for 1.5 hours and then cool the rate PSA for 1.5 hours to 70° F. After the cooling period has been completed, the bed in the rate PSA is again fed feed gas. Other streams including the methane product stream P and waste stream W1 can be used to heat the nitrogen-selective adsorbent. If stream P is used, a temperature of about 300° F. ensures that the methane is desorbed from the sorbent. The preferred method of cooling is to use nitrogen product stream NP. The periodic heating of the nitrogen selective adsorbent has been found to be particularly useful for the CTS-1 adsorbent.

EXAMPLE 4

Preparation of Potassium Exchanged XE Zeolite Beads ("Equilibrium") Adsorbent

I. XE Zeolite Synthesis

The following reagents were added to a 1,000 gallon SS reactor: 904 kg of DI water, 435 kg of a sodium hydroxide solution (38.6% $Na_2O$), 578 kg of a potassium hydroxide solution (37.3% $K_2O$), 1,250 kg of N-Clear sodium silicate (28.7% SiO2/8.93% $Na_2O$) and 1,300 kg of Nalco 2372 sodium aluminate (19.9% $Al_2O_3$/18.1% $Na_2O$) while stirring at ~75 rpm. This stirred slurry was then heated to 75° C. and reacted for 20 hours. The resulting product slurry was filtered on a plate and frame filter press then washed with 1,000 gallons of DI water at 75° C. This initially washed cake was reslurried in 1,000 gallons of DI water and then heated to 75° C. for 60 minutes. The reslurry was filtered on the plate and frame filter press and then finally washed with 2,000 gallons of DI water at 75° C. This washed XE zeolite cake was then potassium exchanged as follows:

II. Preparation of Potassium Exchanged XE Zeolite a. $1^{st}$ Exchange: A 25% potassium chloride solution was prepared as follows: 980 kg of KC1 was dissolved in 3,000 kg of DI water in a stirred (at ~75 rpm) 2,000 gallon SS reactor. To this solution was added the washed XE zeolite cake from Step #I. While stirring at ~75 rpm, this exchange slurry was reacted at 75° C. for 90 minutes. The resulting slurry was filtered on a plate and frame filter press and then washed with 1,500 gallons of DI water at 75° C. This washed cake was further potassium exchanged as follows:

b. $2^{nd}$ Exchange: A second 25% potassium chloride solution was prepared as follows: 980 kg of KC1 was dissolved in 3,000 kg of DI water in the stirred (at ~75 rpm) 2,000 gallon SS reactor. To this solution was added the washed cake from step #IIa. While stirring at ~75 rpm, this exchange slurry was reacted at 75° C. for 90 minutes. The resulting slurry was filtered on a plate and frame filter press and then washed with 1,500 gallons of DI water at 75° C. This second washed cake was finally potassium exchanged as follows:

c. Final Exchange: A 25% potassium chloride solution was prepared as follows: 980 kg of KC1 was dissolved in 3,000 kg of DI water in the stirred (at ~75 rpm) 2,000 gallon SS reactor. To this solution was added the washed cake from step #IIb. The pH of this slurry was then adjusted to 11.0 by the addition of an approximate amount of 45% KOH solution. While stirring at ~75 rpm, this final exchange slurry was reacted at 75° C. for 90 minutes. The resulting slurry was filtered on the plate and frame filter press and then washed with 3,000 gallons of DI water at 75° C. This washed potassium exchanged XE zeolite cake was reslurried in an approximate amount of DI water and then spray dried into a powder.

III. Preparation of Dense 10% Bentonite Bound Beads (⅛") of Potassium Exchanged XE Zeolite 1,360 lbs. (solids basis) of the spray dried potassium exchanged XE zeolite powder from step #IIc was dry blended with 240 lbs. (solids basis) Volclay SPV 200 bentonite powder in an appropriate sized pug mill. After the powders were thoroughly mixed, enough DI water was added to the pug mill to produce a "good" extrusion dough. The dough mixture was extruded into ⅛" pellets using a twin barrel extruder then dried at 110° C. overnight. These dried pellets were then reworked in the pug mill by the addition of sufficient DI water to again produce a "good" extrusion dough. This reworked dough mixture was extruded into ⅛" pellets using the twin barrel extruder, then beaded into ⅛" spheres using an appropriately sized Marumerizer. The "green" beads were tray dried at 100° C., then activated at 250° C. in a rotary calciner. The resulting 40 $ft^3$ of "equilibrium" adsorbent beads were sealed in 55 gallon drums.

EXAMPLE 5

Preparation of CTS-1 Beads ("Rate Adsorbent")

I. ETS-4 Molecular Sieve Synthesis a. Gel Preparation: A caustic solution was prepared by blending together 2,600 lbs. of DI water, 6,806 lbs. of N-Clear sodium silicate (28.7% $SiO_2$/8.93% $Na_2O$) and 6.766 lbs. of sodium hydroxide solution (38.6% $Na_2O$) in a stirred 4,000 gal. tank. An acidic solution of equal volume was prepared by blending together 3,819 lbs. of DI water, 8,395 lbs. of titanium sulfate solution (10.3% $TiO_2$/36.7% $H_2SO_4$) and 631 lbs. of sulfuric acid (96.7% $H_2SO_4$) in a second stirred 4,000 gal. tank. These two solutions were then simultaneously added at ~10 gpm each into a 100 gal. stirred (1,300 rpm) strike tank. The resulting gel was pumped into a 5,000 gal. holding tank at a rate which maintained ~70 gal. of gel in the strike tank.

b. Gel Crystallization to ETS-4: 900 lbs. of the above gel were added to a stirred (~75 rpm) 100 gal. titanium clad stainless steel (SS) autoclave then reacted at 215° C. for 24 hours. 452 lbs. of the resulting product slurry were filtered on a 1.2 $ft^3$ plate and frame filter press, then washed with 75 gal. of DI water at 170° F. This initially washed cake was then reslurried (at ~50 rpm) in 75 gal. of DI water in a 100 gal. SS reactor and heated to 170° F. for 15 min. The reslurry was filtered on the plate and frame filter press and then finally washed with 150 gal. of DI water at 170° F. This washed ETS-4 cake (18.5% $Na_2O$/54.2% $SiO_2$/27.8% $TiO_2$) was then strontium exchanged as follows:

II. Preparation of Strontium Exchanged ETS-4 Molecular Sieve CTS-1

7.84 kg of $SrCl_2 \cdot 6H_2O$ was dissolved in 34 gal. of DI water in the 100 gal. SS reactor. To this solution was added 39.7 kg of the above ETS-4 filter cake which equals 15.7 kg ETS-4 on a dry basis (as determined by an Ohaus moisture analyzer (Model #6010PC). While stirring at ~50 rpm, this exchange slurry was reacted at 170° F. for 90 min. The resulting product slurry was filtered on the 1.2 $ft^3$ plate and frame filter press and then washed with 150 gal. of DI water at 170° F. This washed (Sr/Na) ETS-4 cake (4.37% $Na_2O$/20.3% SrO/50.7% $SiO_2$/23.3% $TiO_2$) was then dried at 110° C.

III. Preparation of Dense 10% Bentonite Bound Beads (~12/+40 Mesh) of CTS-1

1,715 g of the above (Sr/Na) ETS-4 dried cake were added to the bowl of a 12" diameter Eirich blender (Model

R02). This equals 1,650 g (dry basis) as determined by an Ohaus moisture analyzer (Model #6010PC). Next, 196.1 g of bentonite clay powder (Volclay SPV 200) were added to the Eirich bowl. This equals 156.9 g (dry basis) as determined by the Ohaus moisture analyzer. These two dry powders were then mixed for ~10 minutes on the low rotation setting #I and low agitation setting #I.

DI water was then added to the blended powder while still mixing on the low rotation and agitation settings. The water was added a portion at a time, with reduced amounts being added as the mixture got "wetter". The total amount of water added was 1,550 g. The bowl was then rotated on the high setting #II until mostly "oversized", i.e., +12 mesh sized, product was obtained. Occasionally, the agitator was turned on (at the low setting #I) to reduce larger chunks. The resulting "oversized" beads were dried at 110° C. overnight, then reworked as follows:

DI water was added to the dried beads while mixing on the low rotation and agitation settings. Again, the water was added a portion at a time, with reduced amounts being added as the mixture got "wetter". 1,260 g of water was added during this step. The bowl was then rotated on the high setting #II until mostly −12/+40 mesh product was obtained. Occasionally, the agitator was turned on (at the low setting #I) to reduce the larger beads. "Oversized" beads were separated by screening with a 12 mesh screen, then reworked. When the entire product passed through the 12 mesh screen, it was dried overnight at 100° C. The dried beads were then classified using 12 and 40 mesh screens. The total weight of dried −12/+40 mesh beads obtained was 1,196 g.

Glossary of Terms

Rate Selectivity is defined as to assume that equal concentrations of component A and B exist above a clean adsorbent at time zero. If component A adsorbs at a faster ratio than component B then the adsorbent is rate selective for component A.

Equilibrium Selectivity is defined as to assume that equal concentrations of component A and B exist above an adsorbent. Further, the adsorbed phase concentration is not changing in time, and the gas phase concentration is not changing as a function of time. If component A adsorbs to a higher concentration in the adsorbed phase than component B, then the adsorbent is equilibrium selective for component A.

Rate PSA is defined as a PSA that exploits a rate selective adsorbent.

Equilibrium PSA is defined as a PSA that exploits an equilibrium adsorbent.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A pressure swing adsorption (PSA) process for the separation of nitrogen from a mixture of the same with methane which comprises:
   (a) passing a feed stream comprising said mixture to a first PSA unit containing a nitrogen selective adsorbent so as to preferentially adsorb nitrogen and produce a product stream containing at least 90 mol % methane and a purge stream;
   (b) recovering said product stream;
   (c) passing said purge stream to a second PSA unit containing a methane selective adsorbent so as to produce a product stream rich in nitrogen and a purge stream rich in methane;
   (d) recovering said nitrogen-rich product stream; and
   (e) treating said purge stream rich in methane so as to remove heavy hydrocarbons from said purge stream rich in methane.

2. The process of claim 1, wherein said purge stream rich in methane is treated by cooling so as to liquefy the heavy hydrocarbons and, subsequently separating said heavy hydrocarbons from methane.

3. The process of claim 1, wherein said purge stream rich in methane after treatment in step (e) is recycled to said feed stream.

4. The process of claim 1, wherein said heavy hydrocarbons removed from said purge stream rich in methane include $C_3+$ hydrocarbons.

5. The process of claim 1, wherein said heavy hydrocarbons comprise $C_3+$ hydrocarbons, said purge stream rich in methane containing at least about 1 mol % of said $C_3+$ hydrocarbons.

6. The process of claim 5, wherein said purge stream rich in methane after treatment in step (e) is recycled to said feed stream.

7. The process of claim 1, wherein the nitrogen selective adsorbent of step (a) is a CTS-1 zeolite characterized as having a pore size of approximately 3–4 Angstrom units and a composition in terms of mol ratios of oxide as follows:

wherein M is at least one cation having a valence n, y is from 1 to 100, and z is from 0 to 100, said zeolite being characterized by the following X-ray diffraction pattern.

| D-spacings (Angstroms) | $I/I_0$ |
| --- | --- |
| 11.4 ± 0.25 | Very Strong |
| 6.6 ± 0.2 | Medium-Strong |
| 4.3 ± 0.15 | Medium-Strong |
| 3.3 ± .07 | Medium-Strong |
| 2.85 ± .07 | Medium-Strong |

8. The process of claim 7, wherein the methane selective adsorbent of step (c) is selected from the group consisting of a high aluminum X having a silicon-to-aluminum ratio of about 1, zeolite 13X, carbon or silica gel.

9. The process of claim 1, wherein the nitrogen selective adsorbent of step (a) is barium exchanged ETS-4 wherein barium represents at least 30% of the exchangeable cations.

10. The process of claim 1, wherein the methane selective adsorbent of step (c) is selected from the group consisting of a high aluminum X having a silicon-to-aluminum ratio of about 1, zeolite 13X, carbon or silica gel.

11. The process of claim 1, wherein a co-current depressurization step is introduced into said first PSA unit to generate a fuel stream.

12. The process of claim 1, wherein said first PSA unit operates under the conditions of rate selectivity.

13. The process of claim 12, wherein said second PSA unit operates under the conditions of equilibrium selectivity.

14. The process of claim 1, wherein subsequent to step (c) periodically heating said nitrogen selective adsorbent to drive off accumulated methane therefrom.

15. The process of claim 14, wherein the nitrogen selective adsorbent of step (a) is a CTS-1 zeolite characterized as having a pore size of approximately 3–4 Angstrom units and a composition in terms of mol ratios of oxide as follows:

wherein M is at least one cation having a valence n, y is from 1 to 100, and z is from 0 to 100, said zeolite being characterized by the following X-ray diffraction pattern

| D-spacings (Angstroms) | I/I₀ |
|---|---|
| 11.4 ± 0.25 | Very Strong |
| 6.6 ± 0.2 | Medium-Strong |
| 4.3 ± 0.15 | Medium-Strong |
| 3.3 ± .07 | Medium-Strong |
| 2.85 ± .07 | Medium-Strong. |

16. The process of claim 14, wherein the nitrogen selective adsorbent of step (a) is barium exchanged ETS-4 wherein barium represents at least 30% of the exchangeable cations.

17. The process of claim 14, wherein the nitrogen-selective adsorbent is periodically heated with the nitrogen rich product stream of said second PSA unit.

18. The process of claim 14, wherein said nitrogen-selective adsorbent is periodically heated with said purge stream from said first PSA unit.

19. The process of claim 14, wherein said nitrogen selective adsorbent is periodically heated with said methane product stream.

20. The process of claim 19, wherein the nitrogen selective adsorbent of step (a) is a CTS-1 zeolite characterized as having a pore size of approximately 3–4 Angstrom units and a composition in terms of mol ratios of oxide as follows:

$$1.0 \pm 0.25\ M_{2/n}O:TiO_2:ySiO_2:zH_2O$$

wherein M is at least one cation having a valence n, y is from 1 to 100, and z is from 0 to 100, said zeolite being characterized by the following X-ray diffraction pattern.

| D-spacings (Angstroms) | I/I₀ |
|---|---|
| 11.4 ± 0.25 | Very Strong |
| 6.6 ± 0.2 | Medium-Strong |
| 4.3 ± 0.15 | Medium-Strong |
| 3.3 ± .07 | Medium-Strong |
| 2.85 ± .07 | Medium-Strong |

* * * * *